(12) United States Patent
Ramirez

(10) Patent No.: US 7,602,493 B2
(45) Date of Patent: Oct. 13, 2009

(54) ELECTRONIC COLOR MATCHING APPARATUS AND METHOD OF DISPLAY

(76) Inventor: John Ramirez, 101 S. Rainbow, Las Vegas, NV (US) 89145

(*) Notice: Subject to any disclaimer, the term of this patent is extended or adjusted under 35 U.S.C. 154(b) by 262 days.

(21) Appl. No.: 11/354,287

(22) Filed: Feb. 14, 2006

(65) Prior Publication Data
US 2007/0188512 A1 Aug. 16, 2007

(51) Int. Cl.
*G01N 21/25* (2006.01)

(52) U.S. Cl. .................... 356/402; 348/29; 348/30; 348/34

(58) Field of Classification Search ............... 356/406, 356/30; 345/84, 32; 348/29, 30, 34, 60
See application file for complete search history.

(56) References Cited

U.S. PATENT DOCUMENTS

| | | |
|---|---|---|
| 4,104,809 A | 8/1978 | Day et al. |
| 5,117,101 A | 5/1992 | Moore et al. |
| 5,363,318 A | 11/1994 | McCauley |
| 5,386,496 A | 1/1995 | Arai et al. |
| 5,416,890 A | 5/1995 | Beretta |
| 5,471,052 A | 11/1995 | Ryczek |
| 5,590,251 A | 12/1996 | Takagi |
| 5,604,594 A | 2/1997 | Juffinger |
| 5,668,633 A | 9/1997 | Cheetam et al. |
| 5,690,486 A | 11/1997 | Zigelbaum |
| 5,743,407 A | 4/1998 | Williams |
| 5,838,451 A | 11/1998 | McCarthy |
| 5,844,680 A | 12/1998 | Sperling |
| 5,961,324 A | 10/1999 | Lehmann |
| 5,963,333 A | 10/1999 | Walowit et al. |
| 6,008,905 A | 12/1999 | Breton et al. |
| 6,157,454 A | 12/2000 | Wagner et al. |
| 6,262,804 B1 | 7/2001 | Friend et al. |
| 6,362,849 B1 | 3/2002 | Caisey-Bluteau et al. |
| 6,583,880 B2 | 6/2003 | Berstis |
| 6,665,965 B1 | 12/2003 | Turchi et al. |
| 6,674,530 B2 | 1/2004 | Berstis |
| 6,798,517 B2 | 9/2004 | Wagner et al. |
| 6,816,284 B1 | 11/2004 | Hill et al. |
| 6,870,523 B1 * | 3/2005 | Ben-David et al. ............ 345/84 |
| 6,937,249 B2 | 8/2005 | Herbert et al. |
| 6,952,263 B2 | 10/2005 | Weiss et al. |

OTHER PUBLICATIONS

"Color Theory: Overview, Color Basics, Color Systems, Shade and Tints", www.worqx.com.

* cited by examiner

*Primary Examiner*—Kara E Geisel
*Assistant Examiner*—Abdullahi Nur
(74) *Attorney, Agent, or Firm*—James D. Erickson

(57) ABSTRACT

In accordance with the description, electronic color matching apparatus with a display of multiple independently controllable segments enable a user to visually compare, capture, catalog and disseminate color as tangible information. In one embodiment, the invention provides an accurate color display representation of a color by means of a novel color screen that is also capable of hundreds of shade adjustments of the overall RGB color component levels until an exact color Hue is displayed. Such a novel color screen of this invention may be designated as an RGBH screen or display device. (Red, Green, Blue, Hue).

17 Claims, 4 Drawing Sheets

ELECTRONIC COLOR MATCHING APPARATUS AND METHOD OF DISPLAY

BACKGROUND OF THE INVENTION

1. Field of the Invention

This disclosure relates to color matching and such as has been previously done through the use of standard color chips or fan decks. Specifically the invention involves the electronic capturing, cataloging, transporting, transmitting, and displaying of accurate colors to facilitate architectural and interior design and reproduction.

2. Description of Related Art

Paint companies and companies that specialize in color technology are the dominant source of standard color chips or fan decks. To date this is the state-of-the-art in the industry for capturing, cataloging, and disseminating color information. Interior designers, painters and architects all rely on these color chips or fan decks, which are generally used to match paint colors and to facilitate color coordination and balancing. Fan decks are printed numbered color palettes that are bound together. Examples of such systems and devices are shown in U.S. Pat. No. 4,104,809 entitled "Color Sample Display Device" issued to Frederick Day et al., U.S. Pat. No. 5,743,407 entitled "Color Reference System For Decorators" issued to Martha Williams, and U.S. Pat. No. 6,665,965 entitled "Ergonomic Color Sample Fan Deck" issued to Mario Turchi et al.

Currently it is difficult for a professional to attempt to capture, catalog or convey color objectively. Current technologies fail to come up with a concise solution that can remove inaccuracies in color matching and color balancing.

What remains is no real ability to go out and capture color at the local level and accurately convey the exact appearance of the color to others or reproduce the exact color for use for design purposes. Unless a chip is taken off a wall or there is an exact match found from a limited palette of colors in a fan deck, the likelihood is there will need to be some compromises. In either case the problem only gets worse when it is required to convey an accurate representation of specific colors, to various professionals in a community or around the world. In order to further illustrate the problems involved, the following scenario often occurs:

An interior decorator goes to a client's house to document a project. Documentation consists of all the design particulars the interior decorator client has put forth and most importantly current existing colors as well as new colors to be used. One issue of great importance to the interior decorator client is color capture. In dealing with the interior decorator's client's multi-million-dollar home one of the most desired abilities is to capture a specific color at the job site that the client wants to incorporate into the overall decor of the project. Capturing color with fan decks is found to be inadequate. Generally, the interior designer will bring bulky fan decks to the job site and upon trying to match a color will not find an appropriate color representation but rather a close resemblance of the color in "brand x" fan deck close to numbers 102 and 103. Such color information cannot be easily conveyed to a paint store. Even though fan decks are state-of-the-art they are inadequate in everyday color matching. The average fan deck has approximately 1,200 colors whereas millions, if not billions of colors exist in the visible light spectrum. Furthermore, communicating color matches with words is difficult. Often, the conversation is ambiguous, recommending a shade or a hue modification from a standard "brand x" fan deck color.

Devices have been developed which allow one to capture the basic color composition of a surface. Such a device is described in U.S. Pat. No. 6,798,517 entitled Handheld, Portable Color Measuring Device with Display issued to Gregg Wagner et al. This device only measures the Red-Green-Blue levels of light reflected from the target surface that is scanned by the device. However, the display capability of the device is only used to show alphanumeric information such as the average RGB levels in relative numbers in the form of percentages or graphically in the form of three bars with lengths indicating the relative magnitude of each color component (Red, Green, and Blue). In another embodiment of this device the display indicates a color number referring the "closest match" to a known industry standard color.

Similar devices are described in U.S. Pat. Nos. 6,674,530 and 6,583,880 both entitled "Portable Colorimeter" and both issued to Viktors Berstis. These devices also disclose a similar LCD display that provides graphical and or alphanumeric information about the component levels of the measured color.

In spite of the existence of such known industry standard colors designing with color is still not concise when returning from the jobsite to the office desktop. Different software programs and printers inevitably lead to inconsistencies due to color reproduction inaccuracies. Different methods of display and display devices represent the same color component mixture many times as very different hues by being unable to achieve the proper tint or shade by controlling the levels of white or black respectively. These inaccuracies are magnified by the inherent difficulty in representing a painted surface that exhibits color based on a subtractive color method, with a light emitting device such as a LCD or CRT screen that represents colors through an additive color method.

These color systems are explained on the www.worqx.com web site in the following linked pages: Color Theory Overview, Color Basics, Color and Systems.

A subtractive color mixing system refers to the process of painting, printing, dying or otherwise coloring an object by adding a mixture of pigments to for example, a white surface or object, which initially reflects all frequencies of light and thereby appearing white. Each paint or ink pigment added to the mixture increases the number of light frequencies that are absorbed by the surface or object thus subtracting from those frequencies that are reflected to determine the color that the object appears. The more pigments added to the mixture the more the color tends toward black.

Conversely an additive color mixing system refers to the process of controlling the frequencies of visible light actually transmitted or projected to the eye. The specific frequency of the projected light determines the color of the visible light observed. As more frequencies of visible light are added to the projection or display screen mixture the color of that visible light tends toward white light.

In order to obtain certain shades or tints of a specific color paint, ink, or dye it is common practice to add amounts of black pigment to obtain shades and white pigment to obtain tints. In representing color on projection screens the three components of white light, namely Red, Green, and Blue are typically used. However, the achievement of various shades or tints has not been accomplished in the previously cited prior art device displays.

The limitations discussed above indicate a significant need for a tool that allows a user to accurately capture and display a relatively infinite variety of visible colors and the ability to match those colors.

SUMMARY OF THE INVENTION

The electronic color matching apparatus and method of the present invention have been developed in response to the present state-of-the-art, and in particular, in response to the problems and needs in the art that have not yet been fully solved by currently available color capture and color display devices which do not accurately reproduce color with all possible shades and tints.

In one embodiment, the invention provides the ability to capture the basic RGB components of any colored surface or object by means of known RGB sensor technology. It may then provide a more accurate color display representation of the color by means of a novel color screen that is also capable of hundreds of shade adjustments of the overall RGB color component levels until a more exact color match is identified. Such a novel color display of this invention may be designated as an RGBH color screen or display device. (Red, Green, Blue, Hue)

In practice once the more exact color match is identified it may now be numerically displayed, stored, cataloged, and conveyed to devices of similar capability by means of a four part code consisting of the three RGB color component levels and at least one hue (H) component level. Each of these four component levels can be represented by numbers ranging from 0 to 255 in at least whole integer steps but preferably in half step decimal intervals or possibly as many as ten decimal step intervals. (ie. 0.0, 0.1, 0.2, 0.3, 0.4, 0.5, . . . 254.6, 254.7, 254.8, 254.9, 255.0) An example of such a four part code for a dark shade of red may be recorded as (255.0, 0.0, 0.0, 226.5). These code values as well as other pertinent information or instructions can be alpha-numerically displayed on the device by way of one or more conventional LCD information displays.

In particular the RGBH color screen or color display of this invention may be composed of a color display with RGB color drivers and one or more light modulators to control the light levels of the display and subsequently adjust the H level from 0 or clear to 255 or black. Such modulation control can be done by means of a modified LCD or Liquid Crystal Display screen.

In another embodiment, the invention also provides one or more additional RGBH color displays approximate one another for the additional viewing of other captured and identified exact color matches or alternatively other previously stored or cataloged four part coded colors together simultaneously. Other standard or cataloged conventional three part coded RGB colors may also be displayed on one or more of the device's RGBH color displays by assuming a hue or H value of 0.0 for display purposes.

The invention may be embodied in a portable hand held device or the same capabilities may be incorporated into a console or table top device with larger RGBH color display, remote color capture module, and other possible computing and communicating capabilities. In either of these forms of the invention both control means as well as input and output communication ports can be incorporated.

In yet another possible embodiment of this invention the RGBH color display may be made of numerous smaller segments which may all be capable of displaying colors with the inventive four component color accuracy. These segments may comprise a matrix of independently driven RGBH segments or display pixels. Such a matrix RGBH color display can be used to show the more accurate four component RGBH colors in either static or dynamically changing driver modes. As an example, such an embodiment may be comprised of a colored LCD display screen with at least one additional LCD layer or component providing the real time controllable and continuously variable clear to black filtering pixel locations essentially covering and thereby modulating each of the corresponding individual RGB color controllable LCD screen pixel locations. The resulting inventive RGBH LCD color display exhibits Hue modification of each individual pixel segment. It should be obvious that such an inventive RGBH color display can be modified to any desired size or shape that when driven by a signal comprised of all four components accurately displays both static and/or dynamic colors.

DETAILED DESCRIPTION OF THE PREFFERED EMBODIMENTS

Figure 1:
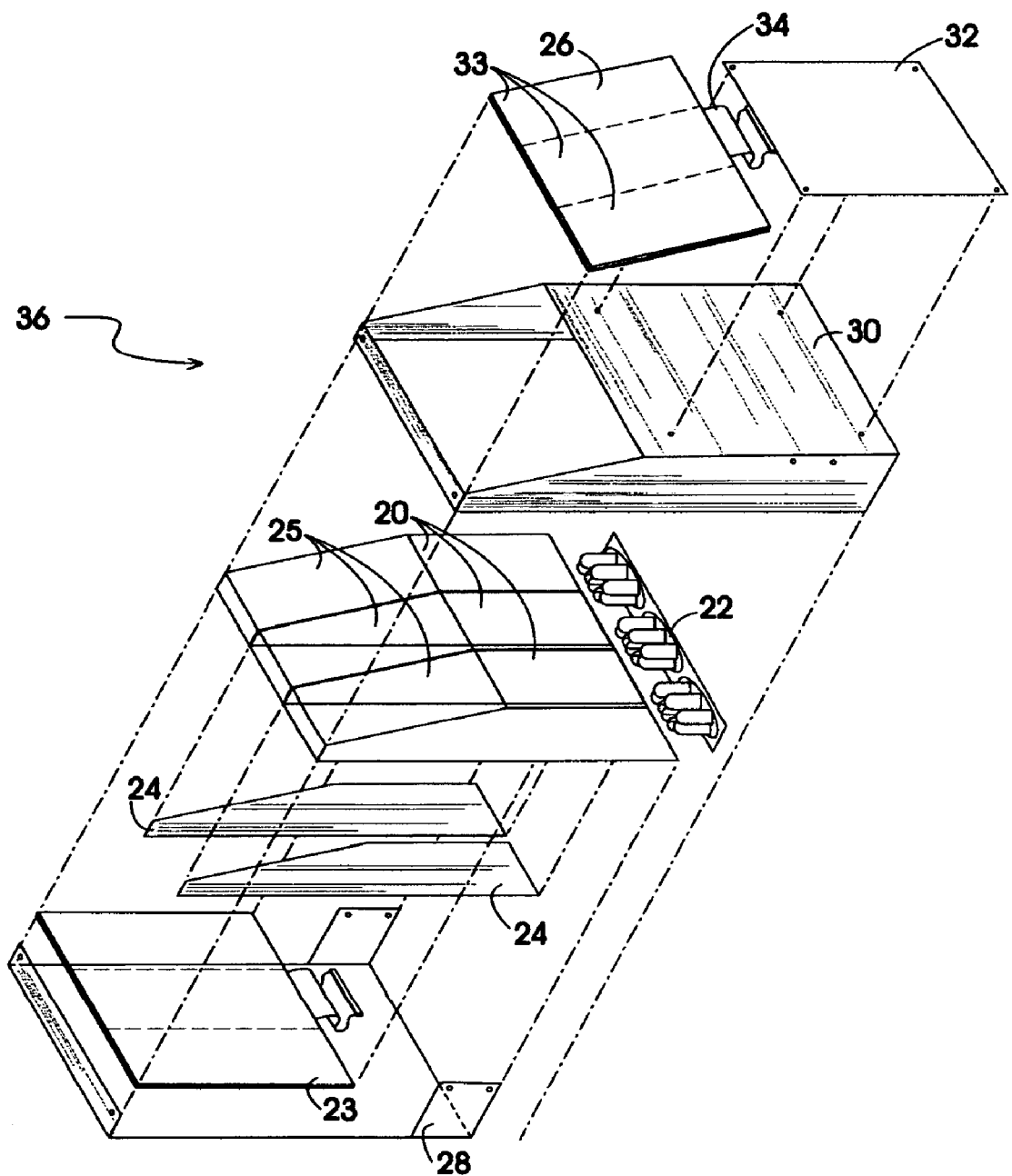
FIG. 1 is a perspective view of an assembly of a plurality of components comprising a portion of an electronic color matching apparatus of this disclosure.

The electronic color matching apparatus of the incident invention disclosure includes a conventional RGB sensor 50 for fast and efficient initial color Red-Green-Blue component capture. Examples of similar RGB sensors have been cited previously and the make up of such a device as well as the method of operation is also known from these sources. This RGB sensor can be incorporated into the portable device as shown in this invention disclosure or can alternatively be a separate attachable unit that connects to the invention through one or more input portals in an embodiment of the invention. The RGB sensor may include its own know source of illumination and means for receiving the frequencies of light reflected from the color surface or object being sensed or measured. Alternatively the electronic color matching apparatus may include a light sensor 52 to evaluate the ambient illumination of the target surface to be measured such that the RGB sensor can accurately determine the color of the surface based on its evaluation of the resulting frequencies of ambient illumination reflected from the target surface. RGB components of the reflected light are then modulated and recorded as the initial estimate of the incident color. This color is then displayed on at least one of the invention's unique RGBH color displays. Since at this point no value for Hue is known for the measured color, it is displayed by means of illuminating the at least one RGBH color display with only the mixed levels of Red, Green, and Blue light indicated by the before mentioned measurement (H=0.0 or clear). The user can now compare the actual color displayed on the at least one RGBH color display (being an additive color mixing system) with the original color of the surface or object (being a subtractive color mixing system) and add or adjust value of the fourth component level of Hue meaning the shading from clear (no shading) to black (total shading) until an exact match is found. At this point the appearance of the RGBH color display will accurately match the original surface or object's color appearance in a side by side comparison. The resulting values of all four component levels [(0.0-255.0), (0.0-255.0), (0.0-255.0), (0.0-255.0)] can now be stored and cataloged in the invention's memory means with such identifiers as file name, date, job, etc. Software specifically developed for this apparatus can be used to display on one or more adjacent RGBH color displays of the invention one or more closely matching or complementing standard colors from the database of the invention to allow comparisons to the incident color. These additional adjacent RGBH color displays can also be used to display side by side comparisons of multiple captured and or previously stored colors from the same or other job sites.

Instead of the bulky and numerous fan decks mentioned previously as prior art, catalogs of interest to the user and or client can be entered into the memory means of the invention to form one or more electronic reference databases. The electronic color matching apparatus of this disclosure is capable of holding thousands of files and catalogs (millions of colors), giving the user virtually endless color displaying and matching potential without the bulk of a fan deck.

The accurate four component RGBH color definition for display in an additive color mixing system now enhances the users ability to store and catalog in the devices memory means more accurate matching and complementary colors, transport said more exact colors from the job site to the office or retail facility, transmit the more exact colors to others having similar means of color representation. Software developed for the electronic color matching apparatus can allow for accurate translation of this more exact four component RGBH color definition back to the subtractive color mixing domain for more accurate printing of representative color samples. This can be achieved through a possible plug-in feature and a third party printer either at the job site or other office or remote site by means of wired or wireless communication from a portable embodiment of the invention or a desk top embodiment of the invention.

It can be appreciated that such a larger desk top embodiment of the incident invention's unique RGBH color display device can be used to display much more complex matrix depictions of the exact color or colors with possible complementary colors in the form of actual color simulated views of the job site or proposed design as a means of accurately viewing many proposed color combinations and or designs.

It should also be obvious that a console having the incident electronic color matching method of display designed for use in a retail store would give consumers more accurate visual color capture and display of swatches or samples that they could bring to the store for utilizing an unlimited number of possible color design capabilities.

By adding an additional Hue controllable layer or component to a typical color display monitor, screen, or LCD giving the previous screen the additional pixel by pixel control of this filter such that it can be modulated from clear to black in multiple levels can convert said typical RGB screen to the inventive RGBH color display or screen. These RGBH controlled color display devices include and may comprise different styles of devices such as desktop consoles with multiple displays of varying sizes and shapes, for use in office and store applications.

Currently digital RGB devices modulate each pixel for each of the three colors (red, green, and blue) between color values of 0 and 255. The electronic color matching devices of this disclosure can be capable of multiple intermediate steps between each integer level of the 256 step typical range. It also as previously described has a similar tuned ability to control the Hue or H levels of each pixel. The following is a more detailed description of one preferred embodiment shown in the figures that utilizes an exemplary three RGBH color displays or pixel segments comprised of light conductor/mixer or light pipes.

Referring to FIG. 1 a portion of an electronic color matching apparatus 45 comprises an assembly of a plurality of components 36. The assembly of said plurality of components 36 comprise a plurality of light conductor/mixer elements 20 including at least one light diffusing surface 25 for light transmission from the RGB light arrays 22 to the light diffusing surface 25. A typical light diffusing surface may consist of an roughened or unpolished surface having more of a translucent rather than totally clear or transparent appearance and therefore acting to diffuse the light impinging on and passing through said surface. These light conductor/mixer elements can be comprised of a suitable prism or light pipe or equivalent light transmitting material. Preferably the light diffusing surface 25 is on the display end as shown in FIG. 1, but alternatively could be located on the RGB light array end or possibly both ends of the light conductor/mixer elements 20. The surfaces surrounding the sides of each of the light conductor/mixer elements 20 comprising the reflector base 28, the side reflectors 24, and the inner surfaces of the case 30 are preferably colored white or otherwise reflective of all frequencies of light so as to enhance both the light conduction and light (color) mixing properties of each individual element.

A separate RGB light array 22 exists for producing the RGB light frequencies in each of the one or more light conductor/mixer elements 20 of the apparatus. Typical RGB light arrays are known in the art to be comprised of various light emitting diodes (LEDs) and will not be described beyond their basic function to introduce the prescribed values of RGB colored light into the light conductor/mixer elements 20 to illuminate the light diffusing surface 25.

Overlaying each of the light diffusing surfaces 25 on the display ends of the plurality of light conductor/mixer elements 20 is a modulated light filtering element 26. Preferably the modulated light filtering element 26 is a segmented liquid crystal display LCD mask with at least as many opacity controllable segments as the number of light conductor/mixer elements 20. In the preferred embodiment shown, the light filtering element 26 is segmented into three independently controllable portions corresponding to and covering each of the respective light conductor/mixer elements 20. The opacity of this LCD mask can be controlled to add the required Hue shading to the displayed color. The LCD mask can be controlled or modulated from totally clear or transparent through a vast range of increasing levels of grey becoming darker and more opaque until a completely opaque black color is displayed. The result of such controlled opacity provides the ability to selectively modulate the levels of the above mentioned fourth Hue shading component of the electronic color matching apparatus. Hundreds of Hue shading levels ranging from 0.0 to 255.0 can provide the ability to emit light with a colored appearance more exactly matching that reflected from a given target object's surface. This true matching reproduction of color is enabled by the control of all four components RGBH consisting of a red component, a green component, a blue component, and the new inventive Hue component. The Hue component providing shades of color such as black to dark red, green, etc. which can not be displayed on the prior standard RGB screens of any type.

The light filtering element 26 is attached to an electronic circuit 32 by means of an electronic connection 34. This electronic circuit 32 allows control of the light filtering element 26 and all of its independently controllable segments 33 (see FIG. 2). While three such independently controllable segments 33 of the light filtering element 26 (one for each of the three light diffusing surfaces 25) are shown in FIG. 1, it should be obvious that any number, size, and shape of independently controllable segments 33 may be used to cover and control the Hue of each corresponding RGB segment of the same number, size, and shape.

Optionally shown in FIG. 1 is an additional light filtering element 23 which can be used to cover a portion of the reflector base 28. The modulation of the segments of this additional light filtering element 23 from clear to gray to black in the previously mentioned levels can effectively reduce the reflectance on this side of the light conductor/mixer elements 20 and thereby partially modulate the shade or Hue of said element. Said additional light filtering element 23 can be controlled in concert with the respective first mentioned light filtering element 26 to provide some additional intermediate modulation levels of Hue for the respective light conductor/mixer element 20.

Figure 2:
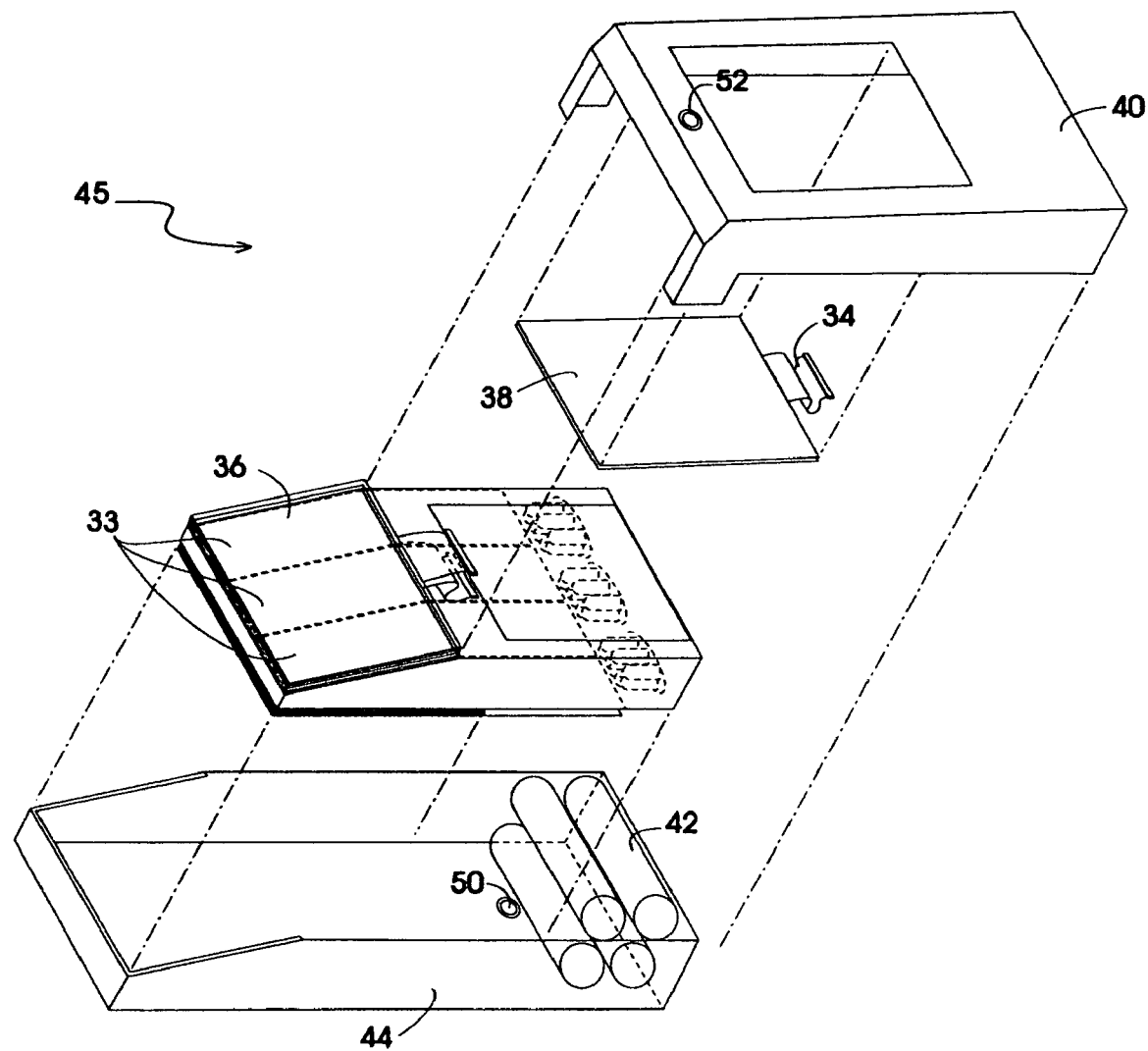
FIG. 2 is a perspective view of an assembly of the plurality of components of FIG. 1 with a plurality of outer parts and casing components.
Figure 3:
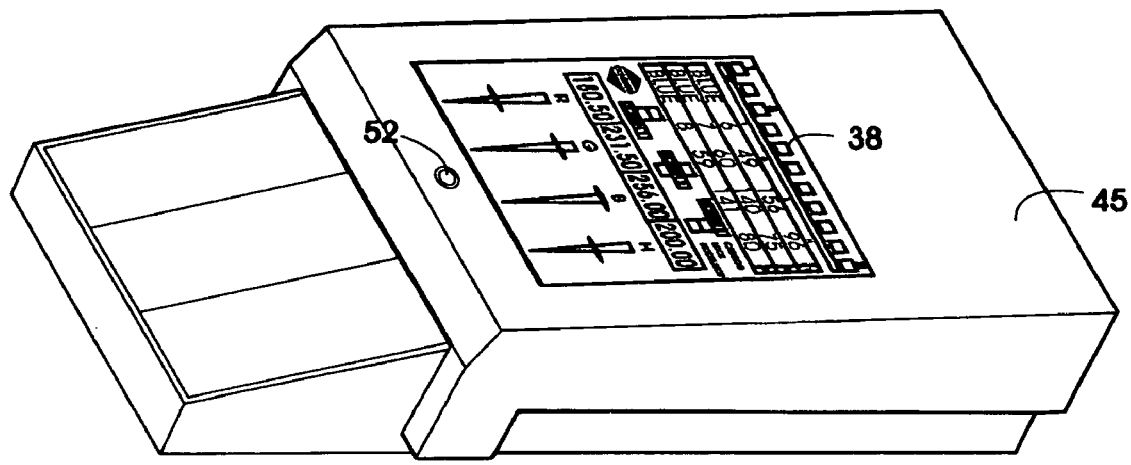
FIG. 3 is a perspective view of the completed assembly of FIG. 2 showing an electronic color matching apparatus of this disclosure.
Figure 4:
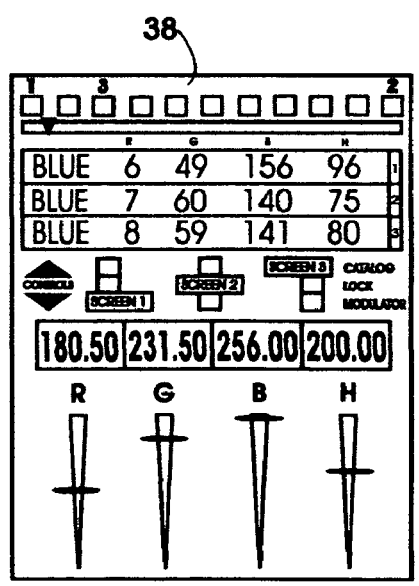
FIG. 4 is a plan view of a general representation of a plurality of components of an electronic color matching apparatus of this disclosure shown with digital and/or analog controls.
Figure 7:
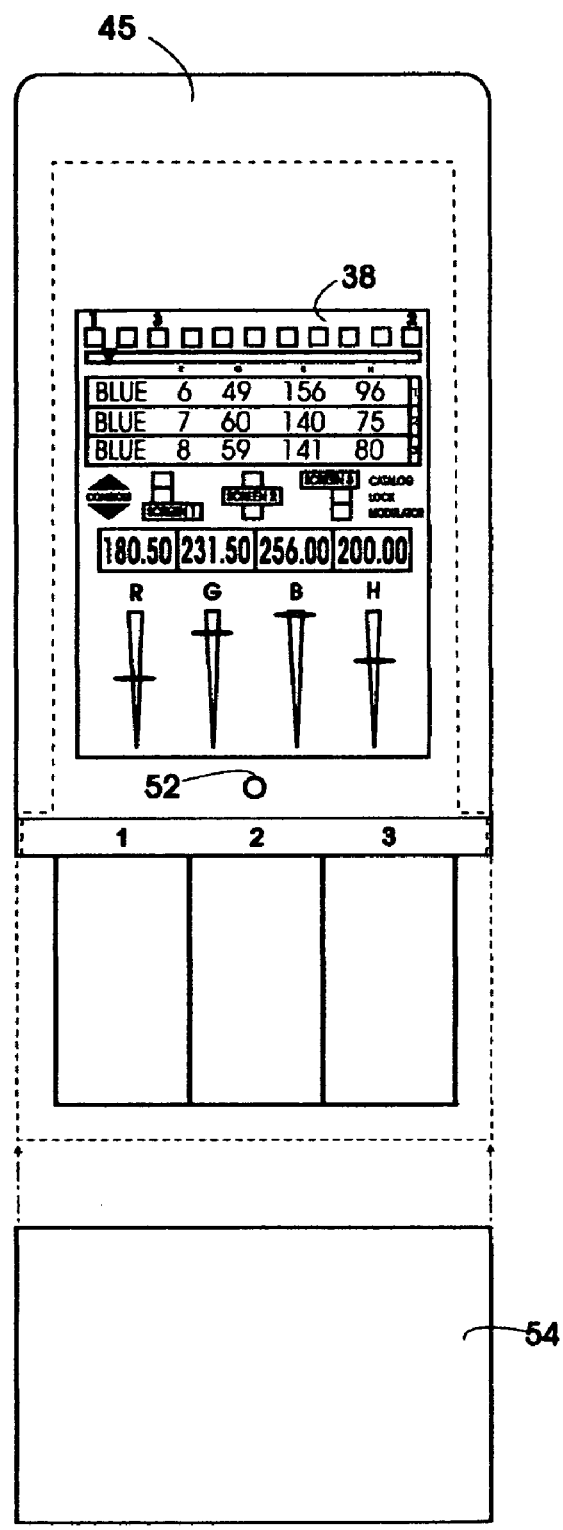
FIG. 7 is a top plan view of an electronic color matching apparatus of this disclosure with modifications to a portion of the outer case showing the removable cover over the display portion.

Referring to FIG. 2, the electronic color matching apparatus 45 comprises the assembly of the plurality of components 36 coupled to a control panel 38 providing a means for inputting commands and control instructions as well as selecting RGBH component levels for any of the independently controllable segments 33 of the display screen. Preferably the control panel 38 is of a type of touch activated display screen such as is common in the art. Typically such a touch screen consists of a solid LCD plate overlaid with a transparent flexible touch sensitive layer both of which are coupled to an electronic control circuit (not shown) by way an electronic connection 34. Such touch screens can be programmed with numerous different control or selection areas intermixed with related informational areas. One example of such a programmed control configuration for this electronic color matching apparatus 45 is shown in FIGS. 3, 4, and 7. The control panel 38 can have one set control configuration such as that shown, or alternatively the operator can select one or more different configurations depending on the specific task required at a given time. An upper case 40 fixes the control panel 38 to the plurality of components 36 and in conjunction with the lower case 44 partially these components along with a power source 42. The power source 42 is preferably a plurality of batteries to allow the electronic color matching apparatus 45 to be mobile. It is understood that fixed power sources that couple to an outer power outlet may also be effectively used.

A light sensor 52 is shown on the upper case 40. This light sensor can be used to sense ambient lighting in the area of the electronic color matching apparatus 45. Evaluating the frequency content of such ambient light can be used for making corrections to color measurements from target surfaces when required.

A RGB sensor 50 shown in the lower case 44 is used to scan a portion of a target surface to detect the RGB light frequency components reflected from the target surface. Such sensors are known in the art as previously described.

Referring to FIG. 3, a perspective view of the assembled electronic color matching apparatus 45 is shown.

FIG. 4 provides a more detailed plan view of one example of the control panel 38. The control panel 38 comprises means for controlling the color display more precisely. An operator may select precise values of red, green, blue, and Hue to be displayed on the electronic color matching apparatus 45. Alternatively physical knobs, sliders, or other forms of analog control could be used in stead of the touch screen controls shown. The desired levels of colors and Hue are represented with numbers ranging between 0 to 255 universal coordinates to provide the RGBH color formulae. These levels may be arbitrarily selected to compare various colors and shades and/or selected from any one of many cataloged colors representing either standard or measured from a target surface. Such standards exist in a vast variety of third party color pallets. Since both standard and measured colors would not have a Hue component value (0.0), the operator can repetitively select different Hue levels until the more exact color and Hue shading is displayed so that the operator can continue to make side by side comparisons to the original target surface or other objects. The formula for this more exact match can of course then be cataloged in job files for further comparisons or use. Multiple color display segments will also enhance side by side comparisons with multiple contrasting and/or complimentary color choices.

Figure 5:
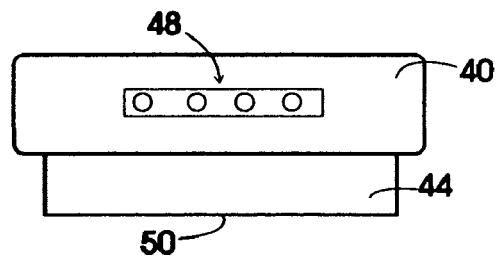
FIG. 5 is a rear elevation view of an electronic color matching apparatus showing a plurality of ports.

FIG. 5 is an elevation view showing a portion of the upper case 40 of the electronic color matching apparatus 45 coupled to the lower case 44 of the electronic color matching apparatus 45. A portion of the upper case 40 comprises a plurality of ports 48 for coupling to suitable devices for exchanging information with the electronic color matching apparatus 45. The RGB sensor 50 is located in a portion of the lower case 44 and is coupled to a circuit board (not shown). Information related to a RGB color profile of the target surface which has been scanned by the RGB sensor 50 is captured and processed by the circuit board coupled to the RGB sensor 50.

Figure 6:
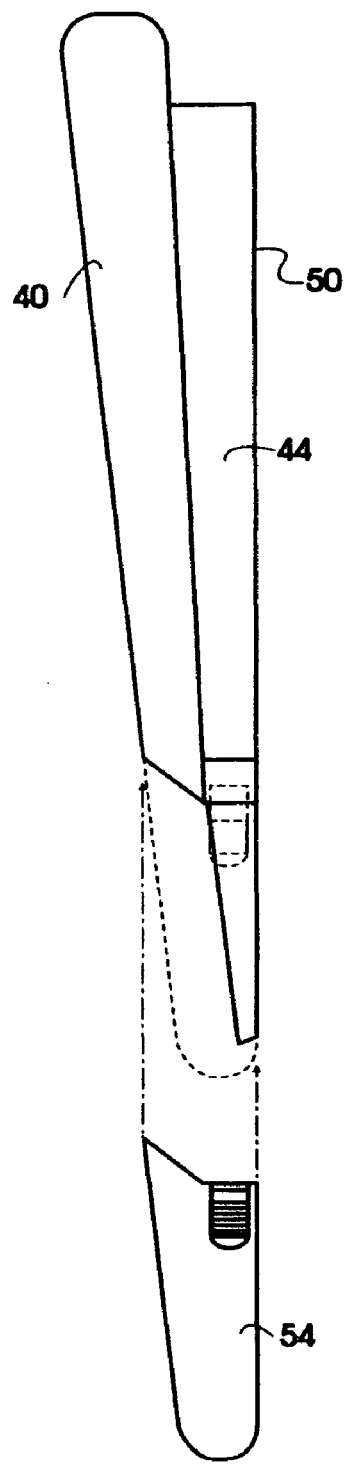
FIG. 6 is a side elevation view of an electronic color matching apparatus with modifications to a portion of an outer case showing a removable cover over the display portion.

FIG. 6 is a side elevation view of the electronic color matching apparatus 45, showing the upper case 40 coupled to the lower case 44 and having a removable cover 54. The removable cover can function to protect the light conductor/mixer elements 20 and the modulated light filtering element 26 displays when the electronic color matching apparatus 45 is not in use.

FIG. 7 is a plan view of the electronic color matching apparatus 45, showing the control panel 38, the light sensor 52 and the removable cover 54.

It is understood that the electronic color matching apparatus 45 may be configured as a desktop console, as well as a hand held mobile device. And while three independently controllable segments 33 are shown in the color display of this embodiment it should also be understood that one is sufficient if controlled with all four component RGBH values to more accurately match not only the color but also Hue shading of any target surface to be analyzed. However, it can be easily seen that there are great advantages to having multiple RGBH color controlled display segments 33 for enhancing the operator's ability to compare various colors side by side. Alternatively, as has been previously described, the electronic color matching apparatus 45 may have a RGBH color display screen that is comprised of numerous independently controllable segments 33 corresponding to each pixel of the display screen. Such a finely divided color video display when driven with all four RGBH values can be used to more accurately reproduce millions of color hues that are not now displayable with existing RGB video display devices.

What is claimed is:

1. An electronic color matching apparatus for displaying colors and hues comprising:
    a plurality of independently controllable segments for displaying colors consisting of Red, Green and Blue; and
    at least one light filtering element for modulating the opacity of said plurality of independently controllable segments for adjusting the hue of the color combination of said Red, Green, and Blue independently controllable segments displayed through said light filtering element.

2. The electronic color matching apparatus of claim 1 wherein said plurality of independently controllable segments and said light filtering element are represented by components RGBH modulated in color formula integer levels (0-255) of each Red, Green, and Blue component; and integer levels (1-10) of the Hue component.

3. The electronic color matching apparatus of claim 1 wherein said plurality of independently controllable segments and said light filtering element are represented by components RGBH modulated in color formula integer levels (0-255) of each Red, Green, Blue and Hue components.

4. The electronic color matching apparatus of claim 1 further comprising:
    a light sensor to correct said plurality of display areas for various extraneous ambient light conditions.

5. The electronic color matching apparatus of claim 1 further comprising:
    an electronic memory for storing one or more databases of a plurality of color files or catalogs of color files.

6. The electronic color matching apparatus of claim 1 further comprising:
    a plurality of plug-in interface ports for receiving and transferring information.

7. The electronic color matching apparatus of claim 6 wherein said electronic color matching apparatus is a handheld mobile device.

8. The electronic color matching apparatus of claim 1 further comprising:
    an RGB sensor to scan and match the color of an existing surface.

9. A handheld mobile electronic color matching apparatus for displaying surface colors and hues comprising:
    an RGB sensor to scan and match the color of an existing surface;
    two or more independently controllable segments for displaying multiple RGB modulated colors adjacent to one another;
    at least one modulated light filtering element for modulating the opacity of said plurality of independently controllable segments for adjusting the light to dark hue of the RGB modulated colors displayed.

10. The handheld mobile electronic color matching apparatus of claim 9 further comprising:
    a light sensor to correct said plurality of display areas for various extraneous ambient light conditions.

11. The handheld mobile electronic color matching apparatus of claim 10 further comprising:
    a plurality of plug-in interface ports for receiving and transferring information; and
    an electronic memory for storing one or more databases of a plurality of color files or catalogs of color files.

12. The handheld mobile electronic color matching apparatus of claim 9 further comprising:
    an electronic memory for storing one or more databases of a plurality of color files or catalogs of color files; and
    a plurality of plug-in interface ports for receiving and transferring information.

13. A method of more accurately displaying colors and hues on an electronic color matching apparatus comprising the following steps:
    Independently controlling the RGB color of a plurality of display segments; and
    Independently controlling the Hue of said plurality of display segments by changing only the light to dark opacity of said display segments with a light filtering element.

14. The electronic color matching apparatus of claim 7 wherein each of said plurality of independently controllable segments is further comprised of:
    an RGB light array; and
    a light pipe including a light diffusing surface for light transmission from said RGB array to said light diffusing surface, wherein said light diffusing surface is overlaid by and independently modulated from light to dark by said at least one light filtering element.

15. The Handheld mobile electric color matching apparatus of claim 9 further comprising:
    a plurality of RGB light arrays; and
    a plurality of light conductor/mixer elements including at least one light diffusing surface for light transmission from said plurality of RGB arrays to the at least one light diffusing surface of the two or more independently controllable segments.

16. The Handheld mobile electric color matching apparatus of claim 15 wherein said at least one modulated light filtering element for modulating the opacity of said plurality of independently controllable segments overlays each of said plurality of light conductor/mixer elements including at least one light diffusing surface to independently filter the light opacity level viewed from said light diffusing surface.

17. The Handheld mobile electric color matching apparatus of claim 15 wherein each of said plurality of light conductor/mixer elements including at least one light diffusing surface also includes one of said plurality of RGB light arrays.

* * * * *